Feb. 9, 1937. W. R. FREEMAN 2,070,266
BRAKE CONTROL MECHANISM
Filed Nov. 9, 1932 2 Sheets-Sheet 1
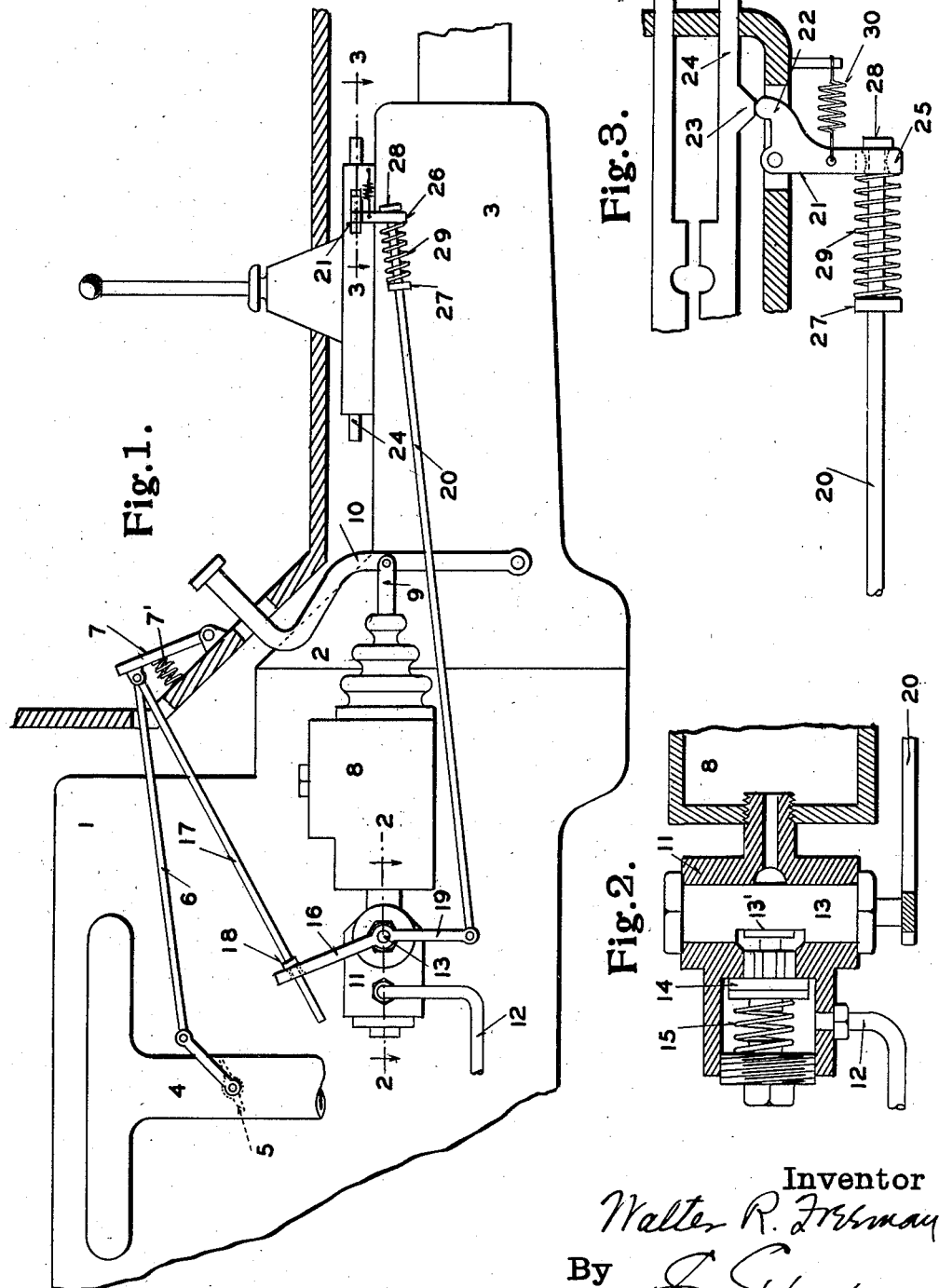
Inventor
Walter R. Freeman
By E. E. Huffman
Att'y.

Feb. 9, 1937. W. R. FREEMAN 2,070,266
BRAKE CONTROL MECHANISM
Filed Nov. 9, 1932 2 Sheets-Sheet 2
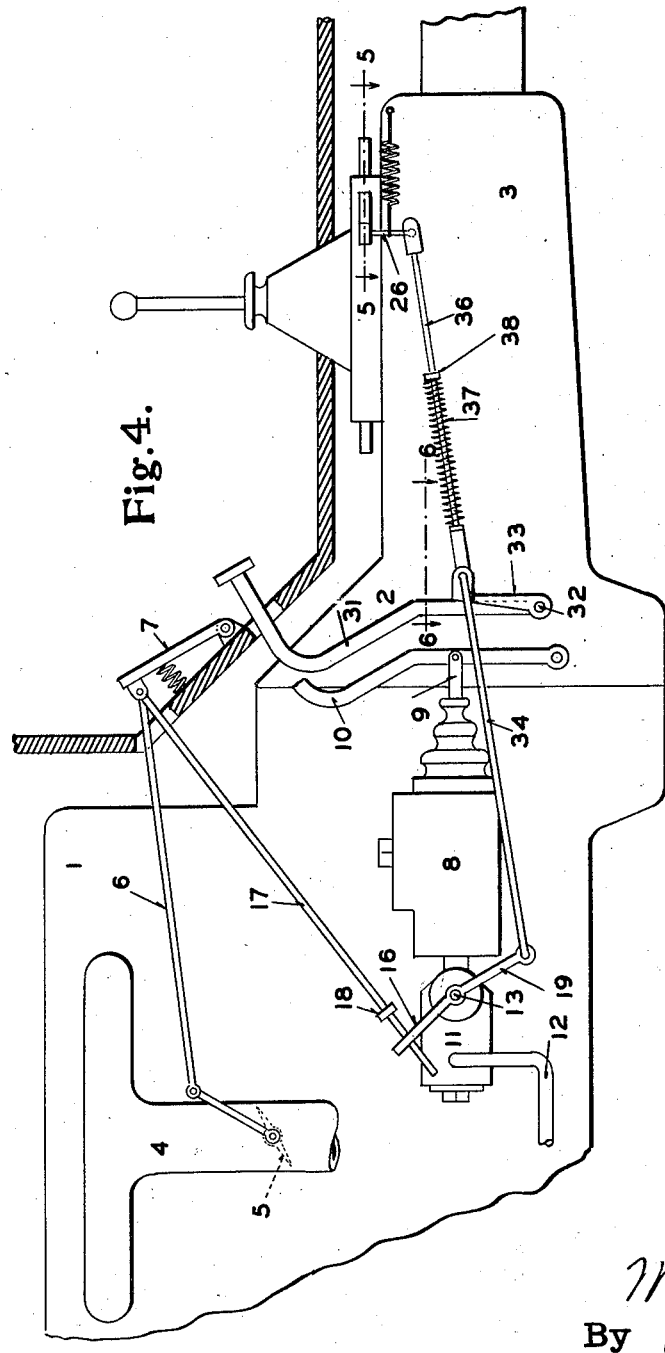
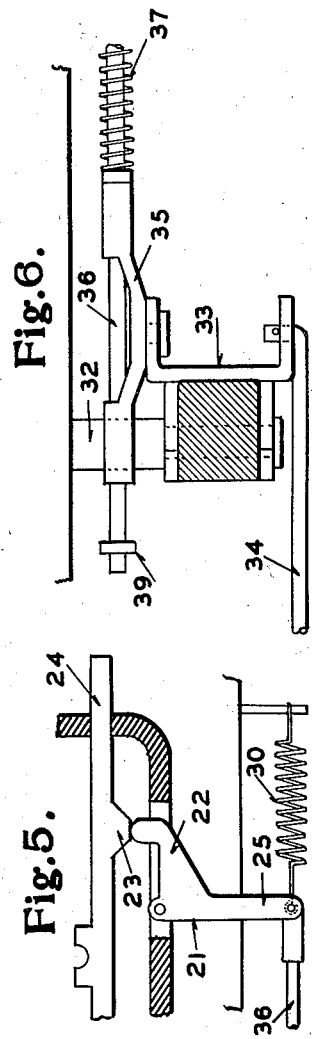
Inventor
Walter R. Freeman
By E. E. Huffman
Att'y.

Patented Feb. 9, 1937

2,070,266

UNITED STATES PATENT OFFICE 2,070,266

BRAKE CONTROL MECHANISM

Walter R. Freeman, University City, Mo., assignor to Wagner Electric Corporation, St. Louis, Mo., a corporation of Delaware Application November 9, 1932, Serial No. 641,832

19 Claims. (Cl. 192—.01)

My invention relates to the control of the brakes of a motor vehicle and more particularly to improvements in the holding means for preventing the release of the brakes from applied position.

One of the objects of my invention is to provide the holding means for preventing release of the brakes from applied position, with means controlled by an element of the change speed transmission for biasing the holding means to operative position and with means for moving said holding means to inoperative position when the accelerator mechanism is actuated.

Another object of my invention is to provide spring means for operating the holding means when the clutch mechanism of the motor vehicle is operated, said spring means being operative when the elements of the change speed transmission are in a selected position and inoperative when the elements are in other selected positions.

Still another object of my invention is to provide a holding means for preventing release of the brakes with means for operating the holding means when the clutch is disengaged and with means for moving the holding means to an inoperative position either by reengagement of the clutch, or by actuation of the accelerator mechanism.

Other objects of my invention will become apparent from the following description taken in connection with the accompanying drawings disclosing two embodiments thereof, in which Figure 1 is a side view of a portion of a motor vehicle showing how I control the brake holding means by the transmission mechanism and the accelerator; Figures 2 and 3 are cross sectional views on the lines 2—2 and 3—3, respectively, of Figure 1; Figure 4 is a side view similar to Figure 1 but showing in addition, the use of a clutch control for the brake holding means; and Figures 5 and 6 are cross sectional views on the lines 5—5 and 6—6, respectively, of Figure 4.

Referring in detail to Figures 1 to 3, I indicates the engine of a motor vehicle which is connected by means of the clutch 2 (the pedal of which is not shown) and a change speed transmission 3 to the road wheels of the vehicle for supplying power thereto. The engine I is provided with an intake manifold 4 in which is situated the throttle 5 operated by the rod 6 and the accelerator pedal 7, the latter being mounted in the operator's compartment of the vehicle and biased by spring 7' to throttle closed position.

The brake system shown is of the hydraulically-actuated type and is chosen for illustration only, it being understood that my invention is not limited to the specific embodiment shown but is capable of use with other types of brake systems. The compressor 8 is secured to the vehicle chassis and the piston thereof is actuated by the piston rod 9 and brake pedal 10, all well known in the art. A holding valve 11 is interposed between the compressor and the conduit 12 leading to the brake shoe actuating fluid motor. This valve may be of any desired construction, the one disclosed being similar to that shown in my co-pending application Serial No. 597,674 filed March 9, 1932. When the operating shaft 13 is in the position shown in Figures 1 and 2, the valve element 14 is seated by the spring 15, thus preventing liquid from returning to the compressor 8. The piston of the compressor under this condition, may be actuated to force liquid into the conduit 12 by unseating the valve element against the action of the spring. When the operating shaft 13 is rotated through a small angle, its cam surface 13' unseats the valve element and maintains it in open position, thus permitting fluid to flow therethrough in either direction.

In accordance with my invention, I provide the valve operating shaft 13 with an arm 16 to be actuated by the accelerator mechanism. The accelerator pedal has pivoted thereto one end of a rod 17, the other end of the rod extending through an opening in the arm 16 and being provided with a shoulder 18 for engaging the arm. The shoulder is so positioned on the rod that when the accelerator mechanism is in "off" position, the arm 16 is adapted to assume a position whereby the valve element 14 is closed, as shown in Figures 1 and 2.

The valve operating shaft 13 is provided with a second arm 19 which is connected by means of a rod 20 with a bell-crank lever 21 pivoted to the transmission housing. One arm 22 of the lever extends within the housing and is adapted to cooperate with a cam 23 carried by the second and high speed shifting rod 24 of the transmission. The other arm 25 of the lever 21 is provided with an extension 26 having an opening through which extends the rod 20. This rod carries a pair of spaced apart shoulders 27 and 28 and a spring 29, the spring engaging the shoulder 27 and biasing the extension 26 against the shoulder 28. A tension spring 30 maintains the arm 22 in cooperative engagement with the cam 23.

In operation, when the gear shifting rod 24 is in its neutral position, as shown in Figure 3 (the transmission being in either neutral, low speed, or reverse), the cam 23 engages the arm 22 of the lever 21 and, through the spring 29, biases the valve shaft 13 to the closed position of the valve. Under these conditions, if the accelerator pedal is in "off" position, the brakes, if applied, will be held in applied position without maintaining pressure on the brake pedal. If the brakes are not applied, the brake pedal may be actuated to unseat the valve element 14 to apply the brakes, they being maintained in applied position by the action of the spring 15 to seat the valve as soon as the brake pedal pressure is released. When the accelerator pedal is actuated, the rod 17, by means of its shoulder 18, will rotate the shaft 13, unseat valve element 14, and release the brakes. The rotation of the shaft 13 causes the shoulder 27 on the rod 20 to compress the spring 29, which spring will again cause the valve element to be reseated as soon as the accelerator pedal is returned to its "off" position. It is thus seen that when the shift rod 24 is in neutral position, the valve 14 will always be biased to closed position when the accelerator pedal is in "off" position, thereby holding the brakes in applied position if they have been applied.

If the shifting rod 24 is in a position to place the transmission in either its second or high speed ratio, the cam 23 will be moved away from the arm 22, thus permitting the spring 30 to pull the lever 21 rearwardly and, by means of the shoulder 28 on the rod 20, unseat the valve element 14. Under these conditions the holding valve is completely inoperative and the braking system operates in the same manner as if the holding valve were eliminated.

From the foregoing it is obvious that my invention is very useful to hold a vehicle on an incline without continuously maintaining the foot upon the brake pedal. My invention is also very useful in starting the vehicle on an upgrade, for with the transmission in low gear, the brakes may be held in applied position without the necessity of holding the right foot on the brake pedal, thereby allowing the operator to actuate the accelerator, which actuation will automatically release the brakes.

Since the vehicle is generally in second or high speed when it is brought to a stop and the brake holding valve is inoperative under these conditions, the brakes may be applied and released in the usual manner by the proper foot pressure to bring the vehicle to the desired stopping point.

In Figures 4, 5, and 6, I have shown, in addition to the accelerator and transmission control, a clutch control for the holding valve for preventing the release of the brakes from applied position. The clutch pedal 31 is shown as secured to the clutch shaft 32. The clutch shaft has pivoted thereto a lever 33 which is connected at its upper end by means of the rod 34 with the arm 19 of the valve operating shaft. The upper end of the lever 33 also carries a member 35 provided with suitable bearings for the reception of one end of a rod 36, the other end of the rod being pivoted to the extension 26 on the lever 21 which is pivoted on the transmission housing, as previously described. The rod 36 carries a spring 37 between the member 35 and a shoulder 38 on the rod. A second shoulder 39 is carried by the rod on the opposite side of the member 35. The spring 30 biases the arm 22 of the lever 21 against the cam 23 in the same manner as in Figure 1.

In operation of the structure shown in Figures 4, 5, and 6, the clutch pedal 31 is in the position shown, which is the engaged position of the clutch, maintains the holding valve in its open or inoperative position, by means of the lever 33 and the rod 34. When the second and high speed shifting rod is in neutral position (shown in Figure 5) its cam 23 cooperates with the lever 21 and compresses the spring 37, thus biasing the lever 33 against the clutch pedal. Upon the actuation of the clutch pedal to disengage the clutch, the spring 37 causes the lever 33 to follow the clutch pedal, thus operating the valve shaft and permitting the valve spring 15 to seat the valve element 14. Under these conditions, if the brakes are in applied position or are later applied, they will be held in applied position if the accelerator is in its "off" position. The closing of the holding valve, by disengagement of the clutch, moves the arm 16 to a point adjacent the shoulder 18 on the accelerator actuated rod 17. The brakes may now be released by either reengagement of the clutch, which recompresses the spring 37, or by actuation of the accelerator pedal. This optional release of the holding valve by either the actuation of the accelerator or by reengagement of the clutch, is a very important feature for the vehicle operator can speed up the engine and release the brakes from applied position prior to engaging the clutch, or engage the clutch and release the brakes prior to speeding up the engine, or secure all three functions simultaneously by the operation of two pedals only.

When the transmission shift rod 24 assumes either a high or second speed position, the spring 30 moves the lever 21 rearwardly, thereby causing the shoulder 39 on the rod 36 to engage the member 35 and prevent the spring 37 from operating the holding valve when the clutch pedal is actuated.

Having fully described my invention, what I claim as new and desire to secure by Letters Patent of the United States is:

1. The combination with the accelerator mechanism and the brake mechanism of a motor vehicle, of holding means for preventing release of the brakes from applied position, means for biasing said holding means to a holding position, and means connected to the accelerator mechanism for directly moving said holding means to an inoperative position when the accelerator mechanism is operated.

2. The combination with the accelerator mechanism and the hydraulic brake mechanism of a motor vehicle, of valve means in said hydraulic brake mechanism for preventing release of the brakes from applied position, means for biasing the valve to closed position, and mechanical connections between said valve and accelerator mechanism for opening the valve against its biasing means when the accelerator is operated.

3. The combination with the accelerator mechanism, the change speed transmission, and the braking mechanism of a motor vehicle, of holding means controlled by an element of the transmission for preventing release of the brakes from applied position, and means operable when said accelerator mechanism is operated for causing said holding means to become inoperative.

4. The combination with the accelerator mechanism, the change speed transmission mechanism, and the braking mechanism of a motor vehicle, of holding means for preventing release of the brakes from applied position, means operable when the accelerator mechanism is operated for moving said holding means to an inoperative position, said holding means also being inoperative when said transmission is in a selective position.

5. The combination with the accelerator mechanism, the change speed transmission mechanism, and the hydraulic braking system of a motor vehicle, of a valve for preventing release of the brakes from applied position, means for biasing said valve to a closed position when the transmission is in a selected speed ratio, said valve being held in an open position when the transmission is in another selected speed ratio, and means operable when the accelerator mechanism is actuated for opening said valve when it is biased to a closed position.

6. The combination with the braking mechanism and the change speed transmission of a motor vehicle, of holding means for preventing release of the brakes from applied position, means operative by an element of the transmission for biasing said holding means to an operative position, and means independent of the transmission for releasing said holding means.

7. The combination with the clutch mechanism and the brake mechanism of a motor vehicle, holding means for preventing release of the brakes from applied position, a member pivoted on the clutch mechanism, a connection between the member and the holding means, and spring means for moving said member to operate the holding means, said spring means being effective to move said member only when the clutch mechanism is actuated.

8. The combination with the clutch mechanism, change speed transmission mechanism, and brake mechanism of a motor vehicle, holding means for preventing release of the brakes from applied position, means operative by an element of the transmission for biasing the holding means toward operative position, said biasing means being permitted to actuate the holding means when the clutch mechanism is operated.

9. The combination with the clutch mechanism, change speed transmission mechanism, and brake mechanism of a motor vehicle, holding means for preventing release of the brakes from applied position, a member connected to the holding means, and means operative by an element of the transmission for biasing the member toward a position to operate the holding means, said last named means being permitted to actuate said member to operate the holding means when the clutch mechanism is actuated.

10. The combination with the clutch mechanism, change speed transmission mechanism, and brake mechanism of a motor vehicle, holding means for preventing release of the brakes from applied position, a member pivoted to the clutch mechanism, a connection between the member and the holding means, and spring means for moving said member to operate the holding means when the clutch mechanism is actuated and the elements of the transmission are in a selected position, said spring means being inoperative to move the holding means when the elements of the transmission are in other selected positions.

11. The combination with the clutch pedal, change speed transmission mechanism, and brake mechanism of a motor vehicle, holding means for preventing release of the brakes from applied position, a member pivoted to the clutch pedal and connected to the holding means, connections between the pivoted member and an element of the transmission and comprising a spring, and means controlled by the element of the transmission for causing said spring to bias the pivoted member into engagement with the clutch pedal.

12. The combination with the accelerator mechanism, clutch mechanism, and braking mechanism of a motor vehicle, holding means for preventing release of the brakes from applied position, means operative when the clutch mechanism is actuated for operating said holding means, and means operable by the actuation of the accelerator mechanism for releasing said holding means independently of the clutch mechanism.

13. The combination with the accelerator, clutch mechanism, and hydraulic brake system of a motor vehicle, valve means for preventing release of the brakes from applied position, a spring for moving said valve to operative position, said spring being operative when the clutch mechanism is actuated, and means connected with the accelerator mechanism for placing said valve in inoperative position when the accelerator mechanism is actuated.

14. The combination with the accelerator mechanism, clutch mechanism, change speed transmission mechanism, and brake mechanism of a motor vehicle, holding means for preventing the release of the brakes from applied position, means operative when the transmission is in a selected position and the clutch mechanism is disengaged for operating said holding means, and means operable by the actuation of the accelerator mechanism for relasing said holding means.

15. The combination with the accelerator mechanism, clutch mechanism, change speed transmission mechanism, and brake mechanism of a motor vehicle, holding means for preventing the release of the brakes from applied position, means operative when the transmission is in a selected position and the clutch mechanism is disengaged for operating said holding means, and means operable by the actuation of the accelerator mechanism for releasing said holding means, said first named means for operating said holding means being inoperative when the transmission is in other selected positions.

16. The combination with the accelerator mechanism, clutch mechanism, change speed transmission mechanism, and brake mechanism of a motor vehicle, holding means for preventing release of the brakes from applied position, means operative when the transmission is in a selected position and the clutch mechanism is disengaged for operating said holding means, and means for releasing said holding means either by actuation of the accelerator mechanism or reengagement of the clutch mechanism.

17. The combination with the clutch mechanism, change speed transmission mechanism, and brake mechanism of a motor vehicle, holding means for preventing release of the brakes from applied position, a spring for operating the holding means when the clutch mechanism is actuated, and means operative by an element of the transmission when in a selected position for preventing the spring from operating the holding means when the clutch mechanism is actuated.

18. The combination with the accelerator mechanism and the brake mechanism of a motor vehicle, of holding means for preventing the release of the brakes from applied position, means for biasing said holding means to a holding position, an operating arm for said holding means, and a rod operatively connecting the arm to the accelerator mechanism for releasing the holding means when the accelerator is actuated, said operative connection permitting the holding means to be in a holding position under the action of its biasing means when the accelerator mechanism is in "off" position.

19. The combination with the accelerator mechanism and the brake mechanism of a motor vehicle, of holding means for preventing release of the brakes from applied position, means acting on the holding means for biasing the holding means to a position in which it prevents release of the brakes, and means for mechanically connecting the accelerator mechanism to the holding means whereby the holding means will be positively moved to inoperative position when the accelerator mechanism is in an operative position, said connecting means permitting said holding means to be moved by its biasing means to a position preventing release of the brakes when the accelerator mechanism is in "off" position.

WALTER R. FREEMAN.